United States Patent [19]
Bentley et al.

[11] 3,886,285
[45] May 27, 1975

[54] PHARMACEUTICAL COMPOSITIONS CONTAINING SUBSTITUTED PHENYL SULPHOXIDES AND SULPHONES AND METHOD OF USING SAME

[75] Inventors: Kenneth Walter Bentley, Willerby; William Ian Rushworth, Beverley, both of England

[73] Assignee: Reckitt & Colman Products Limited, Hull, Yorkshire, England

[22] Filed: Nov. 6, 1973

[21] Appl. No.: 413,229

Related U.S. Application Data
[62] Division of Ser. No. 201,563, Nov. 21, 1971, Pat. No. 3,804,904.

[30] Foreign Application Priority Data
Dec. 7, 1970  United Kingdom............... 58065/70
Dec. 7, 1970  United Kingdom............... 58066/70

[52] U.S. Cl. ................................................. 424/337
[51] Int. Cl. ........................................... H61k 27/00
[58] Field of Search .................................... 424/337

[56] References Cited
FOREIGN PATENTS OR APPLICATIONS
875,533   8/1961   United Kingdom
1,042,489  9/1966   United Kingdom OTHER PUBLICATIONS
Burton and Hog, Auth., J. Chem. Soc., No. 5, 1945.
Baliait, Jour. Indian Chemical Soc., Vol. 38, No. 1, 1961.

*Primary Examiner*—Jerome D. Goldberg
*Attorney, Agent, or Firm*—Bacon & Thomas

[57] ABSTRACT

The invention relates to a method of producing peripheral vasodilation which comprise the oral or parenteral administration in unit dosage form of a compound having the formula

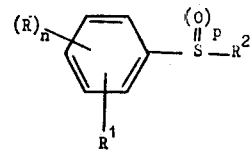

where $n$ is 1 or 2, $p$ is 1 or 2, R, $R^1$ and $R^2$ represent specified radicals. The above compounds are preferably administered together with a pharmaceutically acceptable diluent or carrier therefor, in the form of a pharmaceutical composition.

10 Claims, No Drawings

PHARMACEUTICAL COMPOSITIONS CONTAINING SUBSTITUTED PHENYL SULPHOXIDES AND SULPHONES AND METHOD OF USING SAME

This is a division of application Ser. No. 201,563 filed Nov. 21, 1971 now U.S. Pat. No. 3,804,904.

This invention relates to pharmaceutical compositions and in particular to pharmaceutical compositions which may be used in the treatment of disorders of the cardiovascular system.

According to this invention there are provided pharmaceutical compositions comprising a compound of the formula:

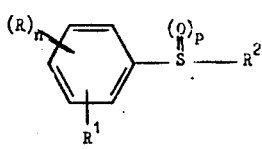

in which
  $n$ is an integer 1 or 2,
  $p$ is an integer 1 or 2
  when $n = 1$ R represents an alkoxy or alkyl group having 1 to 3 carbon atoms,
  when $n = 2$, $(R)_2$ represents alkoxy or alkyl groups having 1 to 3 carbon atoms, chlorine atoms or when attached to adjacent carbon atoms of the benzene ring the group $-O(CH_2)_mO-$ where $m$ is an integer 1, 2 or 3,
  $R^1$ represents a hydrogen atom or when $(R)_n$ represents at least one alkoxy group $R^1$ may also represent a chlorine atom, a bromine atom, an alkoxy or alkyl group having 1 to 3 carbon atoms, a nitro group, an amino group or a pharmaceutically acceptable salt of an amino group,
  $R^2$ represents an alkyl group having 1 to 7 carbon atoms, an alkenyl or alkynyl group having 3 to 5 carbon atoms or a hydroxyalkyl group having 2 or 3 carbon atoms; together with one or more pharmaceutically acceptable diluents or carriers.

In particular the present invention provides pharmaceutical compositions comprising sulphoxides of the formula

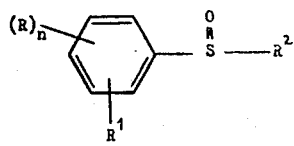

in which R, $R^1$, $R^2$ and $n$ are as hereinbefore defined together with one or more pharmaceutically acceptable diluents or carriers.

In particular the present invention provides pharmaceutical compositions comprising sulphones of the formula

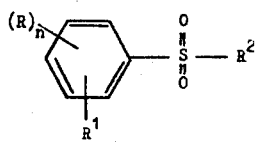

in which R, $R^1$, $R^2$ and $n$ are as hereinbefore defined together with one or more pharmaceutically acceptable diluents or carriers.

The invention also includes compounds of the formula

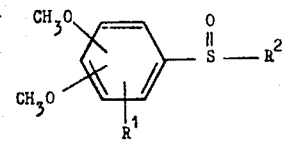

in which $R^1$ represents a hydrogen atom or a methoxy group, and $R^2$ represents an alkyl group having 1 to 7 carbon atoms, an alkenyl or alkynyl group having 3 to 5 carbon atoms, or a hydroxyalkyl group having 2 or 3 carbon atoms.

These compositions produce a significant reduction in blood pressure when administered to normotensive, DOCA or renal rats and also cats and dogs and have utility in the treatment of those conditions in man for which an anti-hypertensive or vasodilator drug is employed.

The pharmaceutical compositions may be in a form suitable for oral administration or in a form suitable for parenteral administration. Compositions intended for oral use may be in the form of tablets, packaged powder or granules, aqueous or oily suspensions, emulsions, hard or soft capsules, lozenges or syrups. Compositions intended for oral use may be prepared according to any method known to the art for the manufacture of pharmaceutical compositions and such compositions may contain one or more sweetening, flavouring, colouring or preserving agents in order to provide pharmaceutically elegant and palatable preparations.

Tablets contain the compound of said formula in admixture with excipients which are suitable for manufacture of tablets. These excipients may be inert diluents, such as, calcium phosphate, lactose, sucrose or dextrose; granulating and disintegrating agents, such as starch or alginic acid; binding agents such as starch, gelatine or acacia; and lubricating agents such as magnesium stearate, stearic acid or talc.

Compositions for oral use in the form of hard gelatine capsules contain the compound of said formula mixed with an inert solid diluent such as calcium phosphate, lactose or kaolin, or as soft gelatine capsules in which the compound of said formula is mixed with an oily medium such as arachis oil, liquid paraffin or olive oil.

Compositions intended for parenteral administration may be in the form of sterile injectable preparations such as solutions or suspensions in water, saline or 1,3-butane diol. The preparations may also contain suitable wetting agents and suspending agents.

For the purposes of convenience and accuracy of dosing the compositions are advantageously employed in a unit dosage form. For oral administration the unit dosage form contains from 1mg to 500mg, preferable from 10mg to 100mg, of the compound of said formula. Parenteral unit dosage forms contain from 1mg to 10 mg of the compound of said formula per 1ml of the preparation. The compounds of said formula may be prepared by oxidising the corresponding thioethers. The oxidation may be carried out employing as the oxidising agent hydrogen peroxide, N-halosucciniaides, 1-chlorobenzo-triazole and other known chemical equivalents.

In the preparation of compounds of said formula in which p = 1 (sulphoxides) suitable methods for carrying out this oxidation include the use of hydrogen peroxide in acetic acid, N-bromosuccinimide or N-chlorosuccinimide in methanol, and 1-chlorobenzotriazole in methanol or methylenechloride.

In order to minimise the formation of a further oxidation product, namely the sulphone (p = 2) an equimolar proportion of the oxidising agent should be employed, and the oxidation conducted at 0°–20°C.

In the preparation of compounds of said formula in which p = 2 (sulphones) a convenient process for carrying out the oxidation is in acetic acid using a 2–3 fold excess of hydrogen peroxide and heating the mixture on a steam bath.

The thioethers used as starting materials may be readily prepared from thiols for example by treatment with an organo-halide or sulphate.

The following examples illustrate the preparation of compounds of said formula:

EXAMPLE 1

3,4-Dimethoxyphenylmethyl sulphoxide 3,4-Dimethoxythiophenol (28.3g, 0.17 mole; A.A. Levi and S. Smiles. J. Chem. Soc. 520 (1931)) was added to sodium (3.83g., 0.17 mole) in absolute ethanol. Dimethyl sulphate (20.8g., 0.17 mole) was slowly added to the mixture which was then refluxed for 2 hours. The solvent was removed under pressure. The residue was extracted with chloroform. The extracts were washed with water, dried over magnesium sulphate and evaporated to give 3,4-dimethoxyphenylmethyl sulphide (28.6g) b.p. 110°C/0.8 mm.

| Anal. | Calcd. for $C_9H_{12}O_2S$ | : C,58.7 | : H,6.6 | : S,17.4 |
|---|---|---|---|---|
| | Found: C,58.5 | : H,6.4 | : S,17.2% | |

30 percent Hydrogen peroxide (11.3ml., 0.1 mole) was added to the 3,4-dimethoxyphenylmethyl sulphide (18.4g, 0.1 mole) in glacial acetic acid (100ml) with cooling. The mixture after remaining at room temperature for 24 hours was made alkaline by the slow addition of ice-cold aqueous sodium hydroxide. The mixture was extracted with chloroform. The extracts were washed with water, dried over magnesium sulphate and evaporated to dryness under reduced pressure to give white crystalline 3,4-dimethoxyphenylmethyl sulphoxide (15.1g). A sample recrystallised from diisopropyl ether had m.p. 82°–84°C.

| Anal. | Calcd. for $C_9H_{12}O_3S$ | : C,54.1 | : H,6.1 | : S,16.0 |
|---|---|---|---|---|
| | Found: C,53.9 | : H,6.3 | : S,15.7% | |

EXAMPLE 2

3,4-Dimethoxyphenylethyl sulphoxide 3,4-Dimethoxythiophenol (8.6g., 0.05 mole), sodium (1.15g., 0.05 mole), ethanol (50ml) and ethyl iodide (7.8g., 0.05 mole) were reacted according to the manner of Example 1 to give 3,4-dimethoxyphenylethyl sulphide (7.3g) b.p. 100°–108°C/0.2 mm.

| Anal. | $C_{10}H_{14}O_2S$ requires | : C,60.7 | : H,7.1 | : S,16.2 |
|---|---|---|---|---|
| | Found: C,60.7 | : H,7.0 | : S,15.9% | |

The 3,4-dimethoxyphenylethyl sulphide (1.98g) was oxidised, according to the manner of Example 1, to give 3,4-dimethoxyphenylethyl sulphoxide (1.6g).

| Anal. | Calcd. for $C_{10}H_{14}O_3S$ | : C,56.1 | : H,6.6 |
|---|---|---|---|
| | Found: C,56.0 | : H,6.4% | |

EXAMPLE 3

3,4-Dichlorophenylmethyl sulphoxide a. 3,4-Dichlorothiophenol (8.9g., 0.05 mole; S.M. Dandin et al Chem. Abs. 52, 8071), sodium (1.15g., 0.05 mole), ethanol (50 ml) and methyl iodide (7.1g., 0.05 mole) were reacted according to the manner of Example 1 to give 3,4-dichlorophenylmethyl sulphide (7.2g) b.p. 76°–80°C/0. 2 mm.

The 3,4-dichlorophenylmethyl sulphide (5.7g., 0.03 mole) was dissolved in dry methanol (80ml) and cooled to 0°C in an ice-bath. N-chlorosuccinimide (4g., 0.03 mole) was added in increments whilst keeping the temperature below 10°C. The mixture was allowed to stand for an hour. The solvent was removed under reduced pressure. The residue was extracted with chloroform. The extracts were washed with water, dried over magnesium sulphate and evaporated to give a white oil, which on trituration with light petroleum ether afforded crystalline 3,4-dichlorophenylmethyl sulphoxide (4.8g) m.p. 72°–74°C.

| Anal. | Calcd. for $C_7H_6Cl_2OS$ | : C,40.2 | : H,2.9 | : Cl,34.0 | ; S,15.3 |
|---|---|---|---|---|---|
| | Found: C,39.7 | : H,2.7 | : Ch,34.2 | : S,15.8% | | b. The 3,4-dichlorophenylmethyl sulphide (4.0g., 0.03 mole) was dissolved in dry methylene chloride (50ml) and cooled to −78°C in a dry-ice/alcohol bath. 1-Chlorobenzotriazole (3.6g., 0.03 mole) was added and the mixture was allowed to warm to room temperature (45–60 minutes). The mixture was washed successively with 10 percent aqueous sodium hydroxide then water, and finally dried over magnesium sulphate. The solvent was evaporated off under reduced pressure, to give a produce (3.5g) m.p. 72°–74°C., identical to that obtained in (a) above.

EXAMPLE 4

2,5-Dimethoxyphenylmethyl sulphoxide 2,5-Dimethoxythiophenol (2.8g., 0.017 mole: Suter and Hansen J. Am. Chem. Soc. 54, 4102, (1932)) was added to sodium (0.4g., 0.017 mole) in absolute ethanol. Dimethyl sulphate (2.1g., 0.017 mole) was slowly added to the mixture which was then refluxed for 2 hours. The solvent was removed under reduced pressure. The residue was extracted with chloroform. The extracts were washed with water, dried over magnesium sulphate and evaporated to give 2,5-dimethoxphenylmethyl sulphide (2.8g) b.p. 92°–96°C/0.3mm.

Anal. Calcd. for $C_9H_{12}O_2S$ : C,58.7 : H,6.6 : S,17.4
Found: C,59.0 : H,6.5 : S,17.5%

The 2,5-dimethoxyphenylmethyl sulphide (2.3g) was oxidised according to the manner of Example 1 to give 2,5-dimethoxyphenylmethyl sulphoxide (1.8g) m.p. 70°–72°C.

Anal. Calcd. for $C_9H_{12}O_3S$ : C,54.1 : H,6.1 : S.16.0
Found: C,53.5 : H,6.0 : S,16.5%

EXAMPLE 5

3,4-Dimethoxyphenylmethyl sulphone 3,4-Dimethoxyphenylmethyl sulphide (6.1g., 0.03 mole) and 30 percent hydrogen peroxide (11.3ml., 0.1 mole) were heated on a steam bath for 2 hours in glacial acetic acid (100ml). The mixture was poured on to ice (300g) and the resulting white precipitate filtered, washed well with water and recrystallised from ethanol to give 3,4-dimethoxyphenylmethyl sulphone (5.7g) m.p. 115°–117°C.

Anal. Calcd. for $C_9H_{12}O_4S$ : C,50.0 : H,5.6 : S,14.8
Found: C,49.8 : H,5.8 : S,14.7

EXAMPLE 6

3,4-Dimethoxy-6-nitrophenylmethyl sulphone 3,4-Dimethoxyphenylmethyl sulphone (6.5g., 0.03 mole) was dissolved in concentrated nitric acid (20ml) and allowed to stand at room temperature for 1 hour. The mixture was poured onto ice and the yellow precipitate filtered off and recrystallised from ethanol to give 3,4-dimethoxy-6-nitrophenylmethyl sulphone (5.8g) m.p. 186°–188°C.

Anal. Calcd. for $C_9H_{11}NO_6S$ : C,41.4 : H,4.2 : N,5.4 : S,12.3
Found: C,41.4 : H,4.1 : N,5.4 : S,12.3

EXAMPLE 7

6-Amino-3,4-dimethoxyphenylmethyl sulphone 3,4-Dimethoxy-6-nitrophenylmethyl sulphone (4.0g) was dissolved in acetic acid (100ml) and stannous chloride (20g) in concentrated hydrochloric acid (20ml) added. The mixture was heated on a water bath for one-half hour, the acetic acid was evaporated off under reduced pressure, and the aqueous layer was basified with dilute aqueous sodium hydroxide and extracted with chloroform. The chloroform extracts were dried over magnesium sulphate and evaporated to give a yellow oil which solidified on standing. The product was recrystallised from ethanol to give 6-amino-3,4-dimethoxyphenylmethyl sulphone (1.4g) m.p. 97°–98°C.

Anal. Calcd. for $C_9H_{13}NO_4S$ : C,46.8 H,5.7 : N,6.1 : S,13.9
Found: C,46.9 : H,5.6 : N,6.2 : S,13.8

The Table below sets out details of further examples of compounds of said formula. The compounds in which p = 1 (sulphoxides) were prepared by the method of Example 1, and those in which p = 2 (sulphones) were prepared by the method of Example 5.

Table

| Example | Substituent on Benzene Ring 2 | 3 | 4 | 5 | 6 | $R^2$ | P | m.p °C | Formula | % Calcd. C | H | S | % Found C | H | S |
|---|---|---|---|---|---|---|---|---|---|---|---|---|---|---|---|
| 8 | | MeO | MeO | | | n-Pr | 1 | — | $C_{11}H_{16}O_3S$ | 57.9 | 7.1 | 14.1 | 57.7 | 7.0 | 13.6 |
| 9 | | MeO | MeO | | | i-Pr | 1 | 68–70 | $C_{11}H_{16}O_3S$ | 57.9 | 7.1 | 14.1 | 57.9 | 6.9 | 14.1 |
| 10 | | MeO | MeO | | | n-Bu | 1 | — | $C_{12}H_{18}O_3S$ | 59.5 | 7.5 | | 59.5 | 7.6 | |
| 11 | | MeO | MeO | | | i-Bu | 1 | — | $C_{12}H_{18}O_3S$ | 59.5 | 7.5 | | 58.9 | 7.4 | |
| 12 | | MeO | MeO | | | $CH_2CH=CH_2$ | 1 | — | $C_{11}H_{14}O_3S$ | 58.5 | 6.2 | | 58.5 | 6.3 | |
| 13 | | MeO | MeO | | | $CH_2CH_2OH$ | 1 | 125–6 | $C_{10}H_{14}O_4S$ | 52.2 | 6.1 | 13.9 | 51.8 | 6.1 | 13.8 |
| 14 | MeO | | MeO | | | Me | 1 | — | $C_9H_{12}O_3S$ | 54.1 | 6.1 | | 53.7 | 6.0 | |
| 15 | MeO | | | MeO | | n-Pr | 1 | — | $C_{11}H_{16}O_3S$ | 57.9 | 7.1 | | 57.9 | 7.3 | |
| 16 | MeO | | | MeO | | i-Pr | 1 | — | $C_{11}H_{16}O_3S$ | 57.9 | 7.1 | | 57.7 | 6.9 | |

Table-Continued

| Example | Substituent on Benzene Ring 2 | 3 | 4 | 5 | 6 | R² | P | m.p °C | Formula | % Calcd. C | H | S | % Found C | H | S |
|---|---|---|---|---|---|---|---|---|---|---|---|---|---|---|---|
| 17 | MeO | | | MeO | | n-Bu | 1 | — | $C_{12}H_{18}O_3S$ | 59.5 | 7.5 | 13.3 | 59.3 | 7.2 | 12.8 |
| 18 | MeO | | | MeO | | i-Bu | 1 | — | $C_{12}H_{18}O_3S$ | 59.5 | 7.5 | | 59.3 | 7.2 | |
| 19 | MeO | | | MeO | | $CH_2CH=CH_2$ | 1 | — | $C_{11}H_{14}O_3S$ | 58.5 | 6.2 | | 58.8 | 6.3 | |
| 20 | MeO | | | MeO | | $CH_2CH_2OH$ | 1 | 108–110 | $C_{10}H_{14}O_4S$ | 52.2 | 6.1 | 13.9 | 52.4 | 6.1 | 14.1 |
| 21 | | MeO | MeO | | $NO_2$ | Me | 1 | — | $C_9H_{11}NO_5S$ | 44.1 | 4.5 | 13.1 | 44.1 | 4.5 | 13.2 |
| 22 | | MeO | MeO | MeO | | Me | 1 | 74–6 | $C_{10}H_{14}O_4S$ | 52.2 | 6.1 | 13.9 | 52.2 | 6.1 | 13.9 |
| 23 | | MeO | MeO | | Br | Me | 1 | 152–3 | $C_9H_{11}BrO_3S$ | 38.7 | 4.0 | 11.5 | 38.7 | 3.9 | 11.5 |
| 24 | | Me | Me | | | Me | 1 | — | $C_9H_{12}OS$ | 64.3 | 7.2 | 19.1 | 63.9 | 7.1 | 19.3 |
| 25 | | EtO | EtO | | | Me | 1 | 61–2 | $C_{11}H_{16}O_3S$ | 57.9 | 7.1 | 12.1 | 57.6 | 6.9 | 14.0 |
| 26 | | $OCH_2.CH_2O$ | | | | Me | 1 | — | $C_8H_{10}O_3S$ | 54.6 | 5.1 | 16.2 | 53.8 | 5.0 | 16.1 |
| 27 | | | MeO | | | Me | 1 | 43 | $C_8H_{10}O_2S$ | 56.5 | 5.9 | 18.9 | 56.2 | 6.1 | 18.5 |
| 28 | | MeO | | | | Me | 1 | — | $C_8H_{10}O_2S$ | 56.5 | 5.9 | 18.9 | 56.4 | 5.8 | 18.6 |
| 29 | MeO | | | | | Me | 1 | — | $C_8H_{10}O_2S$ | 56.5 | 5.9 | 18.9 | 56.3 | 6.1 | 18.2 |
| 30 | | Me | | | | Me | 1 | — | $C_8H_{10}OS$ | 62.4 | 6.6 | 20.8 | 62.7 | 6.8 | 20.4 |
| 31 | MeO | MeO | | | | Me | 1 | — | $C_9H_{12}O_3S$ | 54.1 | 6.1 | 16.0 | 54.1 | 6.0 | 16.2 |
| 32 | MeO | | | MeO | | Me | 1 | 97–8 | $C_9H_{12}O_3S$ | 54.1 | 6.1 | 16.0 | 53.6 | 6.2 | 15.7 |
| 33 | | MeO | | MeO | | Me | 1 | 74–6 | $C_9H_{12}O_3S$ | 54.1 | 6.1 | 16.0 | 54.3 | 6.2 | 16.0 |
| 34 | | Cl | MeO | | | Me | 1 | 54 | $C_8H_9ClO_2S$ | 47.0 | 4.4 | 15.7 | 46.9 | 4.5 | 15.7 |
| 35 | Cl | Cl | | | | Me | 1 | 84 | $C_7H_6Cl_2OS$ | 40.4 | 2.9 | 15.4 | 40.2 | 3.0 | 15.5 |
| 36 | Cl | | | Cl | | Me | 1 | 76 | $C_7H_6Cl_2OS$ | 40.4 | 2.9 | 15.4 | 40.4 | 2.9 | 15.2 |
| 37 | Cl | | Cl | | | Me | 1 | 92–94 | $C_7H_6Cl_2OS$ | 40.4 | 2.9 | 15.4 | 40.1 | 2.9 | 15.6 |
| 38 | | Cl | | Cl | | Me | 1 | 69–71 | $C_7H_6Cl_2OS$ | 40.4 | 2.9 | 15.4 | 40.1 | 2.9 | 15.6 |
| 39 | | Cl | Me | | | Me | 1 | 70–71 | $C_8H_9ClOS$ | 51.1 | 4.5 | 17.1 | 51.0 | 4.5 | 17.0 |
| 40 | Me | | MeO | | | Me | 1 | 53–55 | $C_9H_{12}O_2S$ | 58.7 | 6.6 | 17.4 | 58.6 | 6.4 | 17.5 |
| 41 | | Et | Et | | | Me | 1 | — | $C_{11}H_{10}OS$ | 67.4 | 8.2 | 16.4 | 66.5 | 8.3 | 16.4 |
| 42 | | EtO | EtO | | | n-Pr | 1 | — | $C_{13}H_{20}O_3S$ | 61.0 | 7.9 | 12.5 | 60.7 | 8.2 | 12.0 |
| 43 | | MeO | MeO | | | n-Am | 1 | — | $C_{13}H_{20}O_3S$ | 61.0 | 7.9 | 12.5 | 60.6 | 8.0 | 12.0 |
| 44 | | MeO | MeO | | | n-$C_7H_{15}$ | 1 | — | $C_{15}H_{24}O_3S$ | 63.4 | 8.5 | 11.3 | 63.4 | 8.5 | 11.4 |
| 45 | | MeO | MeO | Me | | Me | 1 | 92–3 | $C_{10}H_{14}O_3S$ | 56.1 | 6.6 | 15.0 | 56.0 | 6.5 | 14.9 |
| 46 | | MeO | MeO | | MeO | Me | 1 | 117–9 | $C_{10}H_{14}O_4S$ | 52.2 | 6.1 | 13.9 | 53.7 | 6.2 | 14.5 |
| 47 | | Cl | Cl | | | Et | 1 | — | $C_8H_8Cl_2OS$ | 43.1 | 3.6 | 14.4 | 42.9 | 3.6 | 14.2 |
| 48 | | Cl | Cl | | | n-Bu | 1 | — | $C_{10}H_{12}Cl_2OS$ | 47.9 | 4.8 | 12.8 | 48.1 | 4.7 | 13.0 |
| 49 | Cl | | | Cl | | n-Pr | 1 | — | $C_9H_{10}Cl_2OS$ | 45.6 | 4.3 | 13.5 | 45.8 | 4.2 | 13.5 |
| 50 | Cl | | | | Cl | Et | 1 | — | $C_8H_8Cl_2OS$ | 43.1 | 3.6 | 14.4 | 43.2 | 3.6 | 15.1 |
| 51 | Cl | | Cl | | | Et | 1 | — | $C_8H_8Cl_2OS$ | 43.1 | 3.6 | 14.4 | 42.6 | 3.6 | 14.7 |
| 52 | Cl | | Cl | | | n-Pr | 1 | | $C_9H_{10}Cl_2OS$ | 45.6 | 4.3 | 13.5 | 45.6 | 4.2 | 13.8 |
| 53 | Cl | | Cl | | | n-Bu | 1 | — | $C_{10}H_{12}Cl_2O_2S$ | 47.9 | 4.8 | 12.8 | 47.6 | 4.8 | 13.2 |
| 54 | Cl | Cl | | | | n-Bu | 1 | — | $C_{10}H_{12}Cl_2O_2S$ | 47.9 | 4.8 | 12.8 | 47.9 | 4.9 | 12.9 |
| 55 | | Cl | Cl | | | n-Pr | 1 | — | $C_9H_{10}Cl_2OS$ | 45.6 | 4.3 | 13.5 | 45.7 | 4.3 | 13.6 |
| 56 | / | MeO | MeO | Me | | Me | 2 | 141–142 | $C_{10}H_{14}O_4S$ | 52.2 | 6.1 | 13.9 | 52.0 | 6.2 | 14.1 |
| 57 | | MeO | MeO | | Br | Me | 2 | 179–80 | $C_9H_{11}BrO_4S$ | 36.6 | 3.2 | 10.9 | 36.5 | 3.9 | 11.0 |
| 58 | | MeO | MeO | MeO | | Me | 2 | 193–4 | $C_{10}H_{14}O_5S$ | 48.8 | 5.7 | 13.0 | 48.6 | 5.6 | 12.6 |
| 59 | MeO | | | MeO | | Me | 2 | 77–8 | $C_{10}H_{14}O_5S$ | 48.8 | 5.7 | 13.0 | 49.7 | 5.7 | 14.6 |
| 60 | MeO | | MeO | | | Me | 2 | 104–6 | $C_9H_{12}O_4S$ | 50.0 | 5.6 | 14.9 | 49.7 | 5.6 | 15.2 |
| 61 | MeO | MeO | | | | Me | 2 | 84–5 | $C_9H_{12}O_4S$ | 50.0 | 5.6 | 14.9 | 49.8 | 5.5 | 15.1 |
| 62 | | Meo | | MeO | | Me | 2 | 115–5 | $C_9H_{12}O_4S$ | 50.0 | 5.6 | 14.9 | 49.9 | 5.6 | 15.0 |
| 63 | | Cl | Cl | | | Me | 2 | 108–110 | $C_7H_6Cl_2O_2S$ | 37.4 | 2.8 | 14.3 | 37.6 | 2.9 | 14.0 |
| 64 | | Cl | Me | | | Me | 2 | 100–2 | $C_5H_9Cl_2O_2S$ | 47.0 | 4.4 | 15.7 | 46.7 | 4.5 | 15.3 |
| 65 | | Me | Me | | | Me | 2 | 68 | $C_9H_{12}O_2S$ | 58.7 | 6.6 | 17.4 | 58.6 | 6.5 | 17.2 |

The compound of Example 24 had b.p. 125–8°C/1 mm.

The invention is further illustrated by the following examples of compositions in which all parts are by weight.

EXAMPLE I

A mixture of 1 part of 3,4-dimethoxyphenylmethyl sulphoxide, 5 parts of lactose and 5 parts of starch, together with 1 percent of magnesium stearate was compressed into tablets. Conveniently the tablets are of such a size as to contain 10 or 25mg of 3,4-dimethoxyphenylmethyl sulphoxide. Similarly tablets containing 50mg of 3,4-dimethoxyphenylmethyl sulphoxide were prepared from a mixture of 2 parts of the sulphoxide, 5 parts of lactose, 5 parts of starch together with 1 percent magnesium stearate.

EXAMPLE II

A mixture of 1 part of 3,4-dimethoxyphenylmethyl sulphoxide, and 9 parts of a tablet base comprising starch with the addition of 1 percent magnesium stearate was compressed into tablets.

Conveniently the tablets are of such a size as to contain 10 or 25mg of 3,4-dimethoxyphenylmethyl sulphoxide. Similarly tablets containing 50mg of 3,4-dimethoxyphenylmethyl sulphoxide were prepared from a mixture of 2 parts of the sulphoxide, 9 parts of starch together with 1 percent magnesium stearate.

EXAMPLE III

Various strength capsules are prepared containing 3,4-dimethoxyphenylmethyl sulphoxide and the following ingredients (amounts are in mg):

| Sulphoxide | Magnesium stearate | Calcium phosphate | Lactose |
|---|---|---|---|
| 10 | 2 | — | 190 |
| 25 | 2 | — | 175 |
| 50 | 3 | — | 150 |
| 100 | 3 | — | 100 |
| 10 | — | 20 | 170 |
| 25 | — | 20 | 155 |
| 50 | — | 20 | 130 |
| 100 | — | 20 | 80 |

The above ingredients may be screened through a 40 P.S.S. mesh screen before being mixed and filled into hard gelatine capsules.

EXAMPLES IV

Ampoules were prepared containing 5 mls of an isotenic solution prepared from 1 gm 3,4-dimethoxyphenylmethyl sulphoxide and 0.735 gm sodium chloride in 100 mls distilled water. The solution was stable to steam autoclaving at 10 psi for 35 minutes.

EXAMPLE V

The 3,4-dimethoxyphenylmethyl sulphoxide in each of the foregoing Examples I–IV may be replaced by 2,4-dimethoxyphenylmethyl sulphoxide, 3,4-dimethoxyphenylethyl sulphoxide, 2,5-dimethoxyphenylmethyl sulphoxide, 6-amino-3,4-dimethoxyphenylmethyl sulphone, 3,4-dimethoxyphenylmethyl sulphone, 2,5-dimethoxyphenylmethyl sulphone, 3,4-dimethoxyphenylpropyl sulphoxide, 3,5-dichlorophenylmethyl sulphoxide, 3,4,6-trimethoxyphenylmethyl sulphoxide, 3,5-dimethoxyphenylmethyl sulphoxide, or 3,4-diethylphenylmethyl sulphoxide.

Screening for antihypertensive activity has been carried out employing known pharmacological tests such as those using normotensive, DOCA and renal hypertensive rats according to the method of Stanton H.C. and White J.B., Arch. Int. Pharmacodyn. Ther. 154, No. 2, 351 (1966) and Weeks J.R. and Jones J.A., Proc. Exper. Biol & Med. 104, No. 4, 646 (1960).

The following are some of the test results obtained with compounds of said formula. The compounds were administered intraperitoneally at a dose of 100mg/kg to groups of DOCA hypertensive rats, and the figures are for the maximum percentage fall in the blood pressure.

| No. of Example. | % Fall in Blood Pressure. |
|---|---|
| 1 | 65 |
| 2 | 50 |
| 4 | 46 |
| 5 | 59 |
| 7 | 58 |
| 8 | 30 |
| 33 | 50 |
| 38 | 44 |
| 41 | 49 |
| 46 | 51 |

The following are some of the results when compounds were administered orally to groups of DOCA hypertensive rats at dosage levels of 20,50 and 100 mg/kg. At each dose level a group of six rats was employed for each compound. The figures are for the maximum percentage fall in the blood pressure.

| No. of Example. | % Fall in Blood Pressure | | |
|---|---|---|---|
| | 20 | 50 | 100 mg/kg dose |
| 1 | 30 | 36 | 53 |
| 2 | 21 | 34 | 50 |
| 4 | 5 | 14 | 21 |
| 5 | 33 | 41 | 50 |
| 8 | 16 | 28 | 42 |
| 14 | 18 | 18 | 26 |
| 25 | 24 | 25 | 44 |

It is expected that the likely human oral dose of a composition of the invention will be 200–500 mg of active ingredient per day for the relief of hypertension.

It has been shown that these compounds possess interesting and prolonged vasodilator actions which are exerted on the smooth muscle fibres of the blood vessels of the peripheral circulation. There is no action on the autonomic nervous system. That the vasodilator activity is of peripheral origin is demonstrated by the following findings:

1. The compounds have hypotensive activity in spinalised cats and pithed rats.
2. The compounds are active against vasocenstriction produced by noradrenaline and vasopressin in a variety of isolated perfused blood vessel preparation e.g. rabbit ear, rat mesenteric vessels.

Further the compounds antagonise the pressor effects of noradrenaline, tyramine and angiotensin in the anaesthetised cat and dog at 3 to 10 mg/kg. Nictitating membrane contractions were also antagonised.

We claim:

1. A method for treating hypertension which comprises administering to humans an antihypertensive effective amount of a compound of the formula

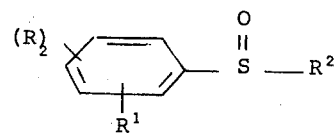

wherein R is alkoxy of 1 to 3 carbon atoms; $R^1$ is H, or alkyl or alkoxy of 1 to 3 carbon atoms and $R^2$ is alkyl of 1 to 7 carbon atoms, alkenyl or alkynyl of 3 to 5 carbon atoms or hydroxyalkyl of 2 to 3 carbon atoms.

2. A method as claimed in claim 1 wherein the compound is 3,4-dimethoxyphenylmethyl sulphoxide.

3. A method as claimed in claim 1 wherein the compound is 3,4-dimethoxyphenylpropyl sulphoxide.

4. A method as claimed in claim 1 wherein the compound is 3,5-dimethoxyphenylmethyl sulphoxide.

5. A method as claimed in claim 1 wherein the compound is 3,4,6-trimethoxyphenylmethyl sulphoxide.

6. The method of claim 1 wherein the compound is 2-methyl-4,5-dimethoxyphenylmethyl sulphoxide.

7. A pharmaceutical composition for the treatment of hypertension which comprises an antihypertensive effective amount of a compound of the formula

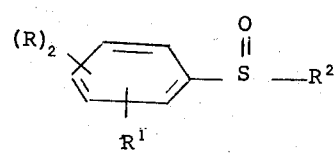

wherein R is alkoxy of 1 to 3 carbon atoms; $R^1$ is H, or alkyl or alkoxy of 1 to 3 carbon atoms and $R^2$ is alkyl of 1 to 7 carbon atoms, alkenyl or alkynyl of 3 to 5 carbon atoms or hydroxyalkyl of 2 to 3 carbon atoms; together with a pharmaceutically acceptable diluent or carrier.

8. A pharmaceutical composition as claimed in claim 7 in unit dosage form for oral administration comprising from 10 to 100 mg of said compound.

9. A pharamceutical composition as claimed in claim 7 in unit dosage form for parenteral administration comprising from 1 to 10 mg of said compound per 1 ml of the composition.

10. The composition of claim 7 wherein the compound is 2-methyl-4,5-dimethoxyphenylmethyl sulphoxide.

* * * * *